United States Patent [19]

Denz et al.

[11] Patent Number: 5,722,371
[45] Date of Patent: Mar. 3, 1998

[54] PROCESS FOR CONTROLLING THE WARM-UP IN AN INTERNAL COMBUSTION ENGINE

[75] Inventors: Helmut Denz, Stuttgart; Martin Klenk, Backnang; Werner Herden, Gerlingen; Hubert Bischof, Vaihingen/enz; Albert Gerhard, Tamm; Matthias Kuesell, Kornwestheim, all of Germany

[73] Assignee: Robert Bosch GmbH, Stuttgart, Germany

[21] Appl. No.: 728,425

[22] Filed: Oct. 10, 1996

[30] Foreign Application Priority Data

Oct. 18, 1995 [DE] Germany .......... 19 538 732.5

[51] Int. Cl.[6] .......... F02P 5/14
[52] U.S. Cl. .......... 123/421
[58] Field of Search .......... 123/421, 424, 123/418; 60/285

[56] References Cited

U.S. PATENT DOCUMENTS

| | | | |
|---|---|---|---|
| 5,271,367 | 12/1993 | Abe | 123/418 |
| 5,357,928 | 10/1994 | Ohtsuka | 123/424 |
| 5,465,967 | 11/1995 | Hamburg et al. | 123/424 |
| 5,535,586 | 7/1996 | Ohta et al. | 60/285 |
| 5,540,202 | 7/1996 | Cullen et al. | 123/424 |

FOREIGN PATENT DOCUMENTS 43 41 796  9/1995  Germany .......... 123/424

OTHER PUBLICATIONS

"Motortechnische Zeitschrift" 50 (1989) 6, pp. 247–254.

*Primary Examiner*—Raymond A. Nelli
*Attorney, Agent, or Firm*—Kenyon & Kenyon

[57] ABSTRACT

In a process for controlling the warm-up in an internal combustion engine, the combustion chamber pressure is evaluated, so that the warm-up period is divided into first and second phases that are controlled differently.

5 Claims, 2 Drawing Sheets

PROCESS FOR CONTROLLING THE WARM-UP IN AN INTERNAL COMBUSTION ENGINE

BACKGROUND INFORMATION

It is known from "Motortechnische Zeitschrift" 50 (1989) 6, pp. 247-254, that the operation of internal combustion engines can be controlled to reduce exhaust gas emissions as a result. The exhaust gas emission is especially high in the case of a cold start, since the catalyst has not reached its operating temperature and thus is not fully ready for operation. In engines and hot exhaust gas conducting components that have reached their operating temperatures, the heat provided by the engine is sufficient for optimum catalyst operation.

It is highly desirable, however, to guarantee that the harmful emissions are reduced as much as possible after a cold start and in the warm-up phase. After cold start in the warm-up phase, the exhaust gases suffer increased heat losses by heating the exhaust system such as the exhaust pipe and the catalyst. In the aforementioned publication, the purpose is to provide a high amount of heat after start in order to make the catalyst ready for operation as quickly as possible. This can be done, for example, by affecting the ignition. Thus, according to the aforementioned publication, the optimum time of ignition is calculated in the control device for each starting temperature and subsequent warm-up period.

The criteria for optimization here are quick warm-up of the catalyst through a retarded ignition angle and extended combustion and thus high exhaust gas temperatures, minimum harmful gas emissions through leaner mixture, combined with ignition advance, minimum fuel consumption through ignition advance angle, and unaffected driveability through the most precise matching of ignition and fuel-air mixture. Thus, in the prior art, the optimum ignition angle is calculated for the warm-up period and, when the heat penetration period has been reached, when the catalytic converter is warmed through so that the Nox emissions are reduced 90%, a new ignition angle is determined by the control device based on the operating parameters.

Due to the very different requirements of the optimization criteria, it cannot always be guaranteed that all points required for optimum operation of the internal combustion engine during warm-up are taken into account.

SUMMARY OF THE INVENTION

The process according to the present invention has the advantage that, by dividing the warm-up period into a first and a second phase, the most varied optimization criteria are taken into account. Thus, in a first phase, when the catalytic converter is still cold, lean combustion takes place with reduced harmful emissions. In the subsequent second phase, when the catalytic converter has warmed up somewhat, the operation is switched to a retarded ignition angle and thus extended combustion, whereby the catalytic converter is fully heated to its operating temperature. Thus, driveability after cold start can be substantially enhanced.

It is especially advantageous to control combustion by analyzing a combustion chamber pressure signal. Thus, conclusions can be drawn at any time regarding the combustion process in the cylinder, which allows the internal combustion engine to operate very close to the leanness limit.

DETAILED DESCRIPTION

Figure 1:
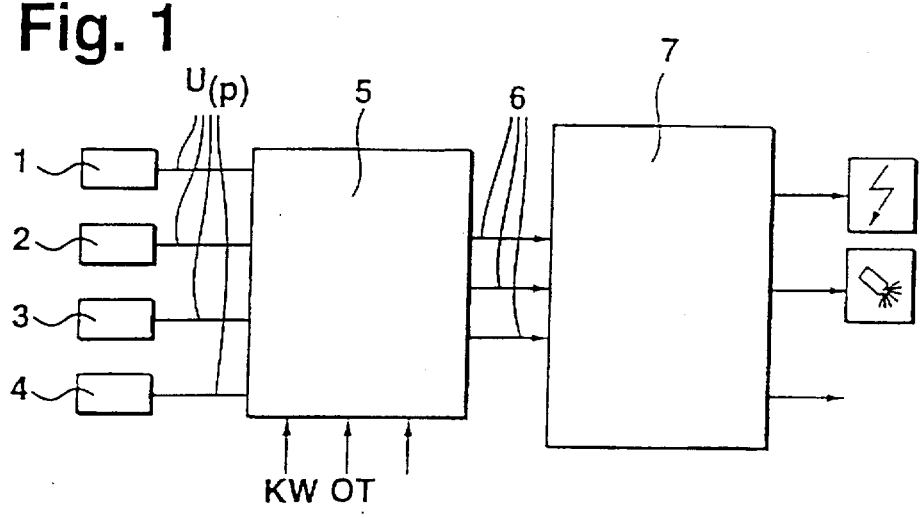
FIG. 1 shows a schematic diagram of an internal combustion engine for carrying out the process according to the present invention.

FIG. 1 shows a device where four combustion chamber sensors 1 through 4, sensing the combustion chamber pressure in the individual cylinders (not shown), are provided. Signal $u_p$ representing the combustion chamber pressure is sent to analyzer 5, which also receives a crankshaft angle signal KW, a cylinder identification signal, for example a signal for the top dead center 0T or a camshaft phase signal. The combustion in the individual cylinders is evaluated in analyzer 5 using an algorithm, which is explained in more detail in connection with FIG. 2. Analyzer 5 determines, on the basis of the combustion conditions and a predefined setpoint condition, manipulated combustion variables 6, which are then forwarded via connecting lines, to control device 7 for controlling the operation of the internal combustion engine, for example, the ignition and/or injection. In normal operation, the control device sets the ignition and the injection to the basic position of the lookup table stored in the control device. Of course, the analyzer can also be integrated with the control device.

Figure 2:
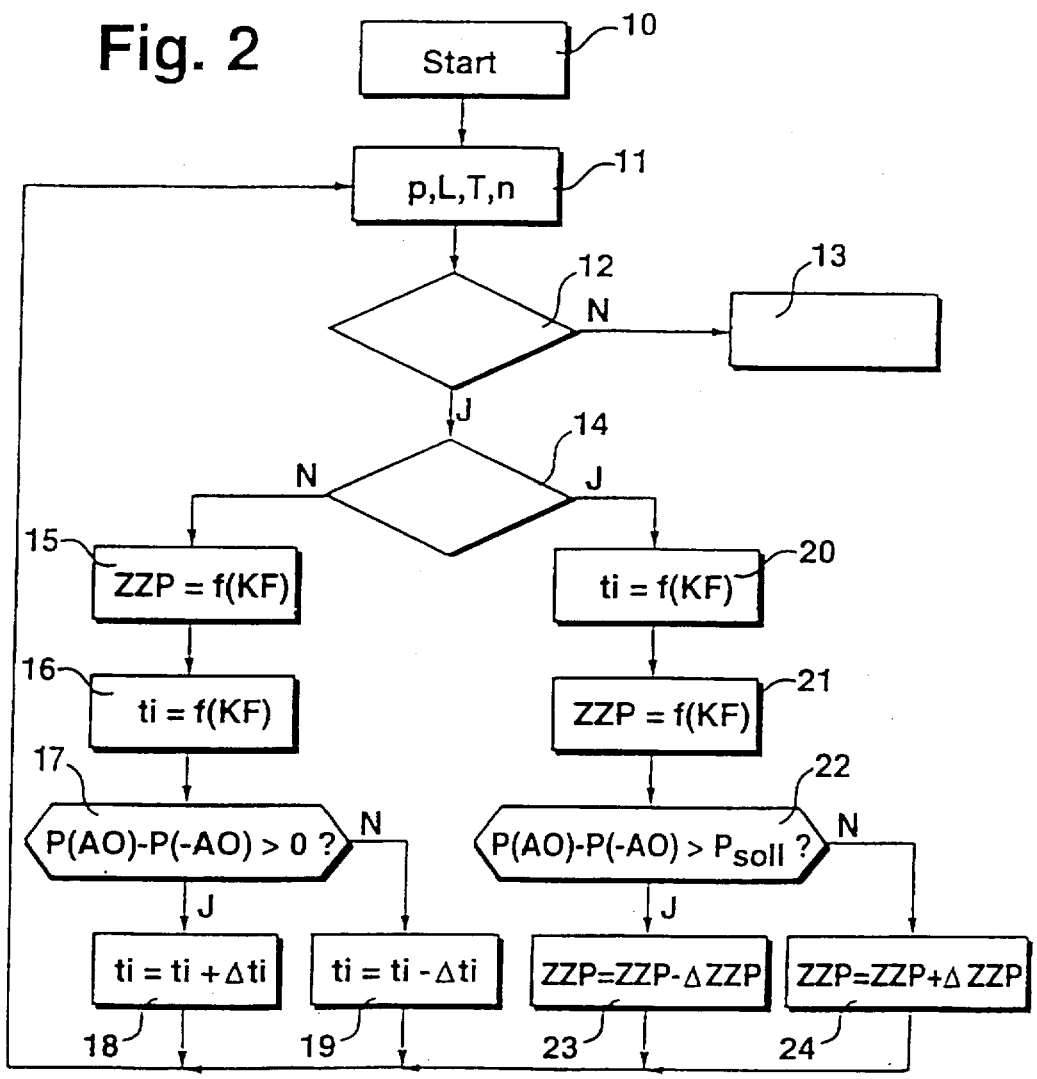
FIG. 2 shows a flow diagram for carrying out the process.

FIG. 2 shows a flow diagram for carrying out the process according to the present invention. In a first step 10, the internal combustion engine is started. In the subsequent step 11, the operating parameters of the internal combustion engine such as load, engine speed, and temperature are sensed. In a subsequent query 12, it is checked if the engine is warming up after a cold start. If the answer is no, the engine is switched over to normal operation NB in step 13. Then the internal combustion engine works in normal lookup table-controlled operation. If, in query 12, the question of whether the engine is warming up is answered by a yes, it is checked, in a subsequent query 14, whether the conditions for switching over from phase 1 of the warm-up period to phase 2 of the warm-up period have been reached.

A no answer regarding the criteria for switching over from phase 1 P1 to phase P2 results in step 15. In step 15 the time of ignition is taken from the lookup table and in the subsequent step 16, the basic injection time $t_i$ is also taken from the lookup table. Then in query 17 it is checked whether the combustion chamber pressure at the time the exhaust valve opens is different from the combustion chamber pressure at the time of the intake. Thus it is ensured that the combustion in the cylinder is completed by the time the exhaust valve opens, in order to maintain the internal combustion engine near the leanness limit. If query 17 is answered with a yes, the injection time $t_i$ can be extended by $\Delta t_i$ in the following cycle. If query 17 is answered with a no, this means that the combustion was fully completed in the cylinder at the time the exhaust valve opened. Therefore in step 19 the injection time $t_i$ in the following cycle must be reduced by $\Delta t_i$. Then the process jumps back to step 11 of the flow diagram.

If in query 14 it is determined that the criteria for switching from phase 1 P1 to phase 2 P2 of the warm-up period have been reached, then in step 20 the injection time $t_i$ is taken from the lookup table stored in the control device. Then also a basic ignition time ZZP is taken from the lookup table for controlling the internal combustion engine. Now in the subsequent query 22 it is checked by this step 21 whether the difference between the cylinder pressures before and after the opening of the exhaust valve is greater than a predefinable value $P_{soll}$, so that $P(AO)-P(-AO)>P_{soll}$. This ensures that the combustion during the second warm-up phase is not yet completed at the time the exhaust valve is opened. The portion of energy with which the exhaust system is warmed up can be determined through the pressure setpoint $P_{soll}$, i.e., the pressure difference $P(AO)-P(-AO)$.

If query 22 is answered with a yes, the time of ignition ZZP can be retarded in the subsequent cycle. If query 22 is answered with a no, the time of ignition is retarded in step 24 by a correction value $\Delta ZZP$. Subsequently steps 23 and 24 lead back to step 11, where the operating parameters are sensed again, and then in step 12 it is checked whether the internal combustion engine is still in the warm-up period.

Figure 3:
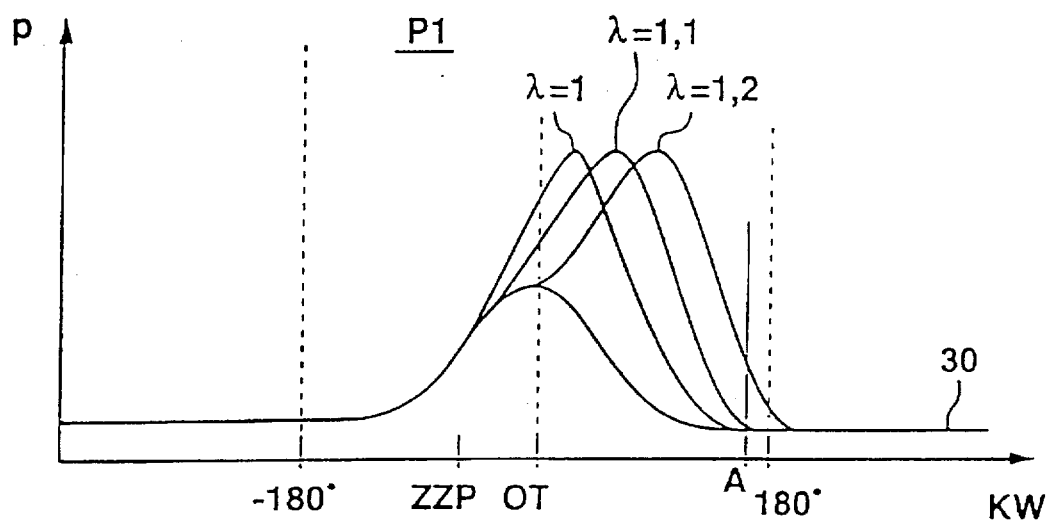
FIG. 3 shows a diagram of pressure variation during the first phase of the warm-up period.

FIG. 3 shows the variation of the combustion chamber pressure in one cylinder over crankshaft angle KW in phase 1 of the warm-up period. Here curve 30 represents the pressure variation in the cylinder without combustion. The time when the exhaust valve opens is denoted as A. The time of ignition zzp is fixed during the operation of the internal combustion engine and corresponds to the time of ignition output by the control device on the basis of the operating parameters. By changing the injection time $t_i$, it is ensured that the combustion in the cylinder is close to the leanness limit and the combustion is completed at the time the exhaust valve opens, for which purpose the pressure difference before and after the opening of the exhaust valve is calculated. As shown in FIG. 3, different injection times result in different combustion processes. The leaner the mixture, i.e., the greater $\lambda$, the later the pressure maximum occurs and the later is the combustion completed. The injection is selected so that the mixture is as lean as possible, and the combustion is completed at the time the exhaust valve is opened; otherwise, unburned mixture would be discharged, since the catalytic converter has not yet reached its operating temperature.

Figure 4:
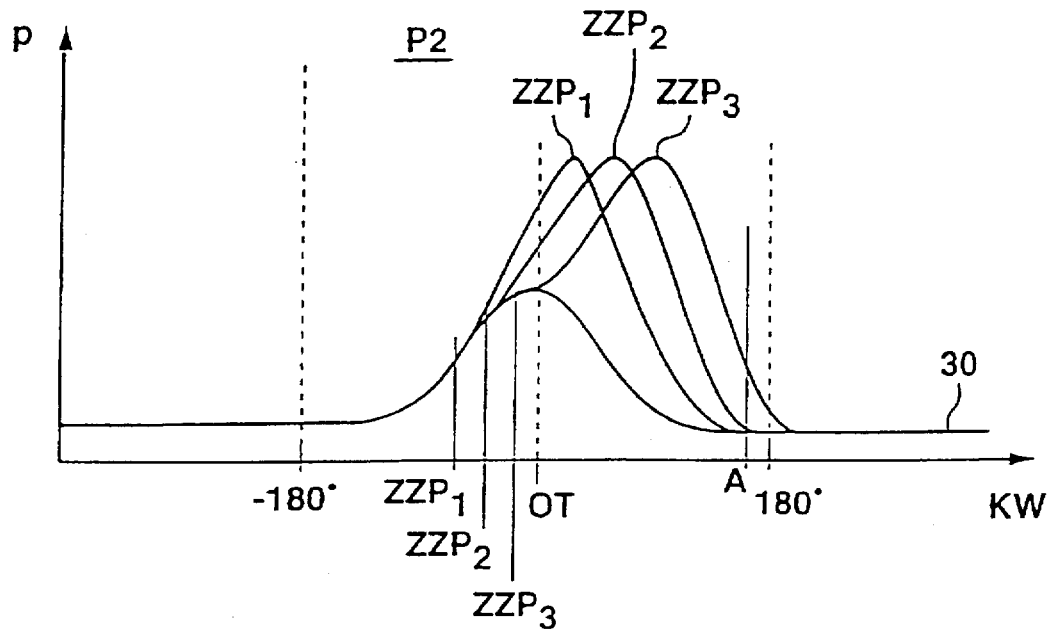
FIG. 4 shows a diagram of pressure variation during the second phase of the warm-up period.

FIG. 4 shows the variation of the combustion chamber pressure during the operation in phase 2 of the warm-up period. Here the injection time is again defined by the control device on the basis of the operating point of the internal combustion engine, and the time of ignition ZZP is changed so that the combustion is not yet completed when the exhaust valve opens. The combustion control via the combustion chamber pressure is known, for example, from German Patent Application No. 43 41 796, and will not be described here in detail.

What is claimed is:

1. A method for controlling a warm-up of an internal combustion engine having an exhaust valve, comprising the steps of:

controlling, in a first phase of a warm-up period of the internal combustion engine, an injection time such that a combustion in a cylinder of the internal combustion engine is completed at a first time that the exhaust valve is opened; and retarding, in a second phase of the warm-up period, a time of ignition such that the combustion in the cylinder of the internal combustion engine is not completed at a second time the exhaust valve is opened.

2. The method according to claim 1, wherein the time of ignition is determined as a function of preselected operation parameters of the internal combustion engine and remains unchanged during the first phase.

3. The method according to claim 1, wherein the injection time determined for an operating range of the internal combustion engine remains unchanged during the second phase.

4. The method according to claim 1, further comprising the step of evaluating a combustion chamber pressure signal for determining control variables in the first and second phases.

5. The method according to claim 1, wherein switch-over criteria from the first phase to the second phase include at least one of a cooling water temperature, an exhaust gas temperature, a time, and a total energy.

* * * * *